United States Patent [19]

Charbonneau et al.

[11] Patent Number: 5,015,722

[45] Date of Patent: May 14, 1991

[54] MELT-PROCESSABLE POLYESTER CAPABLE OF FORMING AN ANISOTROPIC MELT WHICH EXHIBITS A HIGHLY ATTRACTIVE BALANCE BETWEEN ITS MOLDING AND HEAT DEFLECTION TEMPERATURES

[75] Inventors: Larry F. Charbonneau, Mendham; John A. Flint, Berkeley Heights; Gabor D. Kiss, Long Valley; James P. Shepherd, Springfield, all of N.J.

[73] Assignee: Hoechst Celanese Corporation, Somerville, N.J.

[21] Appl. No.: 504,310

[22] Filed: Apr. 4, 1990

[51] Int. Cl.$^5$ ............... C08G 63/02; C08G 63/18; C08G 63/00

[52] U.S. Cl. ............... 528/190; 528/176; 528/193; 528/271; 528/272

[58] Field of Search ............... 528/176, 190, 193, 271, 528/272

[56] References Cited

U.S. PATENT DOCUMENTS

| | | |
|---|---|---|
| 3,637,595 | 1/1972 | Cottis et al. |
| 4,219,461 | 8/1980 | Calundann. |
| 4,299,756 | 11/1981 | Calundann. |
| 4,318,841 | 3/1982 | East et al. ............... 524/605 |
| 4,370,466 | 1/1983 | Siemionko ............... 528/190 |
| 4,473,682 | 9/1984 | Calundann et al. ............... 524/605 |
| 4,614,789 | 9/1986 | Dicke et al. ............... 528/128 |
| 4,684,712 | 8/1987 | Ueno et al. ............... 528/190 |
| 4,746,694 | 5/1988 | Charbonneau et al. ............... 524/602 |

*Primary Examiner*—Harold D. Anderson
*Assistant Examiner*—T. Mosley
*Attorney, Agent, or Firm*—Burns, Doane, Swecker & Mathis

[57] ABSTRACT

The novel polyester of the present invention is melt processable and is capable of forming an anisotropic melt phase. The polyester includes a relatively low concentration of 6-oxy-2-naphthoyl moiety. Other key moieties are 4-oxybenzoyl moiety, terephthaloyl moiety, 1,4-dioxyphenylene moiety, and 4,4'-dioxybiphenyl moiety. The presence of the 1,4-dioxyphenylene moiety in the specified concentration in combination with the other moieties surprisingly has been found to be capable of advantageously lowering the melting temperature of the resulting polyester while making possible the substantial maintenance of a highly attractive heat deflection temperature in molded articles formed from the same. Fibers which exhibit a relatively high modulus also may be formed.

21 Claims, No Drawings

MELT-PROCESSABLE POLYESTER CAPABLE OF FORMING AN ANISOTROPIC MELT WHICH EXHIBITS A HIGHLY ATTRACTIVE BALANCE BETWEEN ITS MOLDING AND HEAT DEFLECTION TEMPERATURES

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (Aug. 1974), (c) *Aromatic Polyester Plastics*, by S. G. Cottis, Modern Plastics, Pages 62 and 63 (July 1975), and (d) *Poly(p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,036,990; 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. Patent Application No. 2,058,102A.

In U.S. Pat. No. 3,637,595 a relatively high melting polymer is disclosed which may comprise 4-oxybenzoyl moiety, dioxyaryl moiety (e.g., p,p'-dioxybiphenylene), and terephthaloyl moiety.

It has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Patent Nos. 828,935 and 28,936; (c) Dutch Patent No. 7505551; (d) West German Nos. 520819, 2520820, 2722120, 2834535, 2834536 and 2834537; (e) Japanese Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,284,757; 4,285,852; 4,287,332; 4,294,955; 4,299,756; 4,311,824; 4,314,073; 4,318,841; 4,318,842; 4,332,759; 4,333,907; 4,335,232; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,374,288; 4,375,530; 4,473,682; 4,522,974; 4,684,712; and 4,746,694; (g) U.K. Application No. 2,002,404; (h) British Patent No. 1,568,541; and (i) European Patent Application Nos. 24,499, 45,499, and 92,843.

Representative disclosures of anisotropic melt-forming polyesters, poly(ester-amides), or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,347,349; 4,351,917; 4,351,918; 4,355,133; 4,359,569; 4,362,777; 4,371,660; 4,375,530; 4,473,682; 4,522,974; 4,684,712; and 4,746,694.

In U.S. Pat. No. 4,219,461 a polyester is disclosed which comprises substantial concentrations of 6-oxy-2-naphthoyl and 4-oxybenzoyl moieties, and symmetrical dioxyaryl and symmetrical dicarboxyaryl moieties. The 6-oxy-2-naphthoyl moieties are provided in a concentration of approximately 20 to 40 mole percent in all instances. Also, while a 4,4'-dioxybiphenyl moiety is illustrated, no polymer is exemplified which incorporates this moiety. In the Example the polymer while in fiber form exhibited a substantially lower modulus than that commonly observed with the specifically defined polymer of the present invention.

In U.S. Pat. No. 4,299,756 a polyester is disclosed which comprises 6-oxy-2-naphthoyl moiety, 3-phenyl-4-oxybenzoyl or 2-phenyl-4-oxybenzoyl moiety, 1,3-dioxyphenylene moiety, and terephthaloyl moiety.

In U.S. Pat. No. 4,318,841 a polyester is disclosed which comprises 6-oxy-2-naphthoyl moiety, 4-oxybenzoyl moiety, the non-symmetrical 1,3-dioxyphenylene moiety, and terephthaloyl moiety.

In U.S. Pat. No. 4,370,466 a polyester is disclosed which comprises about 2.5 to 15 mole percent of 6-oxy-2-naphthoyl moiety, about 40 to 70 mole percent of 4-oxybenzoyl moiety, at least about 10 mole percent of 1,3-dioxyphenylene moiety, and at least 10 mole percent of isophthaloyl moiety. The polymer there reported while in fiber form is indicated to exhibit a substantially lower modulus than that commonly observed with the specifically defined polymer of the present invention.

In U.S. Pat. No. 4,473,682 a polyester is disclosed which comprises approximately 3 to 10 mole percent of 6-oxy-2-naphthoyl moiety, approximately 20 to 70 mole percent of 4-oxybenzoyl moiety, approximately 7.5 to 38.5 mole percent of 4,4'-dioxybiphenyl moiety, and approximately 7.5 to 38.5 mole percent of terephthaloyl moiety. The polyester of the present invention represents an improvement over such polyester. More specifically, the melting temperature of the polyester advantageously is decreased while surprisingly making possible the substantial maintenance of a highly attractive heat deflection temperature in molded articles formed from the same.

It is an object of the present invention to provide a novel melt-processable polyester which forms a highly tractable anisotropic melt phase.

It is an object of the present invention to provide a novel melt-processable polyester which forms an anisotropic melt phase and which has been found to be capable of melt extrusion to form quality high performance fibers, films, three-dimensional molded articles, etc. without the necessity to use a highly elevated melt-processing temperature.

It is an object of the present invention to provide a polyester which is capable of yielding quality fibers which exhibit a relatively high modulus.

It is an object of the present invention to provide a novel melt-processable polyester which forms a melt phase below approximately 375° C. and which is capable of forming a molded article which exhibits a heat deflection temperature of at least 250° C.

It is an object of the present invention to provide a novel melt-processable polyester which can be formed on a more economical basis than those disclosed in U.S. Pat. Nos. 4,219,461 and 4,473,682 since the more costly 6-oxy-2-naphthoyl and 4,4'-dioxybiphenyl moieties are present in lesser concentrations.

These and other objects, as well as the scope, nature and utilization of the invention will be apparent to those skilled in the art from the following detailed description.

SUMMARY OF THE INVENTION

It has been found that a melt-processable polyester capable of forming an anisotropic melt phase at a temperature below approximately 375° C. and which is capable of forming a molded article which exhibits a heat defection temperature of at least 250° C. consists essentially of the recurring moieties I, II, III, IV, and V wherein:

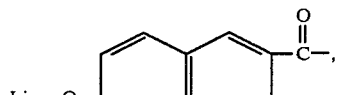

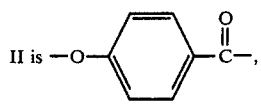

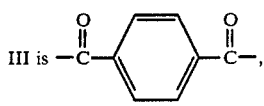

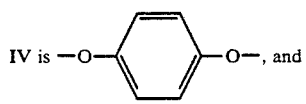

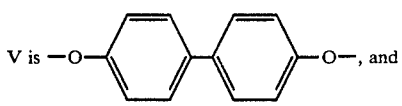

wherein the polyester comprises approximately 1.4 to 10 mole percent of moiety I, approximately 50 to 70 mole percent of moiety II, approximately 10 to 24.3 mole percent of moiety III, approximately 1 to 12.15 mole percent of moiety IV, and approximately 5 to 23.3 mole percent of moiety V, with the proviso that the molar concentration of moiety III is substantially the same as the total molar concentration of moieties IV and V, and the molar concentration of moiety IV does not exceed that of moiety V.

DESCRIPTION OF PREFERRED EMBODIMENTS

The melt-processable polyester of the present invention consists essentially of at least five recurring moieties which when combined in the polyester have been found to form an atypical highly tractable anisotropic melt phase at a temperature below 375° C., and preferably below approximately 370° C. The polymer melting temperature may be confirmed by the use of a differential scanning calorimeter (i.e., DSC) employing repeat scans at a 20° C. per minute heat-up rate and observing the peak of the DSC melt transition. The polyester of the present invention may be considered crystalline in the sense that fibers melt extruded therefrom exhibit x-ray diffraction patterns using Ni-filtered CuKα radiation and flat plate cameras characteristic of polymeric crystalline materials. Because of its ability also to exhibit anisotropic properties (i.e., liquid crystalline properties) in the melt, the polyester readily can form a product having a highly oriented molecular structure upon melt processing. Such product has been found to exhibit unusually high modulus characteristics while in fiber form in combination with other desirable properties. Preferred polyesters are capable of undergoing melt processing at a temperature in the range of approximately 280° to 380° C. (e.g., at approximately 300° to 375° C.). This melt-processing temperature commonly can be achieved while utilizing conventional melt-processing equipment.

The first essential unit (i.e., moiety I) of the polyester of the present invention is 6-oxy-2-naphthoyl moiety of the structural formula:

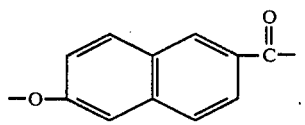

Such moiety preferably is free of aromatic ring substitution and is present in a relatively low concentration as discussed hereafter.

As will be apparent to those skilled in the art, moiety I can be derived from 6-hydroxy-2-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol. Additionally, see U.S. Pat. No. 4,287,357.

Moiety I comprises approximately 1.4 to 10 mole percent of polyester. In a preferred embodiment moiety I is present in a concentration of approximately 2 to 5 mole percent.

The second essential moiety (i.e., moiety II) of the polyester of the present invention is a 4-oxybenzoyl moiety of the structural formula:

Such moiety preferably is free of ring substitution and is present in a substantial concentration. Moiety II may be derived from p-hydroxybenzoic acid or its derivatives. Moiety II is present in a concentration of 50 to 70 mole percent. In a preferred embodiment moiety II is present in a concentration of approximately 58 to 62 mole percent.

The third essential moiety (i.e., moiety III) of the polyester of the present invention is a symmetrical dicarboxyaryl moiety of the formula:

Such moiety preferably is free of ring substitution. Moiety III conveniently may be derived from terephthalic acid or its derivatives.

Moiety III is present in the polyester of the present invention in a concentration of approximately 10 to 24 3 mole percent, and preferably in a concentration of approximately 16.5 to 20 mole percent.

The fourth essential moiety (i.e., moiety IV) of the polyester of the present invention is a 1,4-dioxyphenylene moiety of the structural formula:

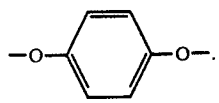

This moiety replaces a portion of the 4,4'-dioxybiphenyl moiety provided in certain embodiments of the polyester of U.S. Pat. No. 4,473,682 as discussed hereafter and surprisingly has been found to make possible an advantageous lowering of the melting temperature of the resulting polyester while making possible the substantial maintenance of a highly attractive heat deflection temperature and other mechanical properties.

Moiety IV is present in the polyester of the present invention in a concentration of approximately 1 to 12.15 mole percent, and preferably in a concentration of 1.5 to 11 mole percent.

The fifth essential moiety (i.e., moiety V) of the polyester of the present invention is a 4,4'-dioxybiphenyl moiety of the structural formula.

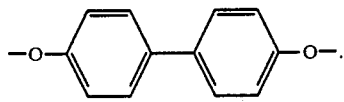

Such moiety preferably is free of ring substitution. Moiety V conveniently may be derived from p,p'-biphenol or its derivatives.

Moiety V is present in the polyester of the present invention in a concentration of approximately 5 to 23.3 mole percent, and preferably in a concentration of approximately 11.5 to 22 mole percent. The molar concentration of moiety III is substantially the same as the total molar concentration of moieties IV and V, and the concentration of moiety IV does not exceed that of moiety V.

As previously indicated, it is preferred that the aromatic rings of moieties I, II, III, IV, and V be free of ring substitution. However, if such substitution is present one or more of the hydrogen atoms present on an aromatic ring may be substituted with an alkyl group of 1 to 4 carbon atoms, an alkoxy group of 1 to 4 carbon atoms, halogen, phenyl, and mixtures of these. The use moieties having unsubstituted aromatic rings generally serves to reduce the cost of forming the novel polyester of the present invention.

Other ester-forming moieties (e.g., dioxy units, dicarboxy units and/or other combined oxy and carboxy units) than those specified for moieties I, II, III, IV, and V additionally may be included in the polyester of the present invention in a minor concentration. Amide-forming moieties also may be included in the polyester of the present invention in a minor concentration. The additional ester-forming moieties and/or amide-forming moieties optionally may be included in the polyester of the present invention so long as such moieties do not raise the melting temperature of the resulting polymer above that specified, do not lower the heat deflection temperature below that specified, and do not otherwise interfere with the exhibition of the desired anisotropic properties in the melt.

In a preferred embodiment, the melt-processable polyester of the present invention consists essentially of approximately 2.5 mole percent of moiety I (i.e., 6-oxy-2-naphthoyl moiety), approximately 61 mole percent of moiety II (i.e., 4-oxybenzoyl moiety), 18.25 mole percent of moiety III (i.e., terephthaloyl moiety), approximately 2 mole percent of moiety IV (i.e., 1,4-dioxyphenylene moiety), and approximately 16.25 mole percent of moiety V (i.e., 4,4'-dioxybiphenyl moiety).

In another preferred embodiment the melt-processable polyester of the present invention consists essentially of approximately 5 mole percent of moiety I (i.e., 6-oxy-2-naphthoyl moiety), approximately 60 mole percent of moiety II (i.e., 4-oxybenzoyl moiety), approximately 17.5 mole percent of moiety III (i.e., terephthaloyl moiety), approximately 8.75 mole percent of moiety IV (i.e., 1,4-dioxyphenylene moiety), and approximately 8.75 mole percent of moiety V (i.e., 4,4'-dioxybiphenyl moiety).

The polyester of the present invention commonly exhibits

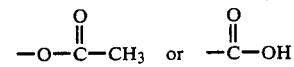

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end-capping units such as phenylester

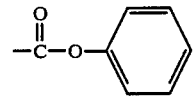

and methylester

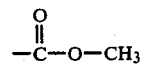

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly is not susceptible to solution processing. It can be readily processed by common melt-processing techniques as discussed hereafter. Most compositions are soluble in pentafluorophenol to some degree.

The wholly aromatic polyester of the present invention commonly exhibits a weight average molecular weight of about 2,000 to 200,000, and preferably about 10,000 to 100,000 (e.g., about 40,000 to 50,000). Such molecular weight may be determined by standard techniques not involving the solutioning of the polymer (e.g., by end-group determination via infra red spectroscopy on compression molded films). Alternatively, light scattering techniques in a pentafluorophenol solution may be employed to determine the molecular weight.

The polyester prior to heat treatment additionally commonly exhibits an inherent viscosity (i.e., I.V.) of at least 6.0 dl./g. (e.g., 6.5 to 9.5 dl./g.) while dissolved in equal parts by volume of pentafluorophenol and hexafluoroisopropanol at 25° C.

The polyester of the present invention prior to heat treatment commonly exhibits a melt viscosity in the range of approximately 10 to 1,500 (preferably 100 to 1,000) poise at 370° C. and a shear rate of 1,000 sec.$^{-1}$. Such determination conveniently may be carried out using a commercially available capillary rheometer.

Unlike the aromatic polyesters commonly encountered in much of the prior art, the polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase conveniently may be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow); however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a largely melt solution of the reactants wherein reactants such as terephthalic acid initially are present to some degree as solids. Low levels of terephthalic acid may dissolve under such circumstances. The polymer product sometimes is suspended therein as solid polymer particles. A vacuum may be applied to facilitate removal of volatiles formed during the final stage of the condensation (e.g., acetic acid or water) and to otherwise expedite the polymerization.

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, IV, and V are derived initially may be provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I, II, IV, and V are provided. Accordingly, particularly preferred reactants for the condensation reaction are 6-acetoxy-2-naphthoic acid, 4-acetoxy-benzoic acid, hydroquinone diacetate, and 4,4'-biphenol diacetate (i.e., 4,4'-diacetoxybiphenyl). See, the description of U.S. Pat. No. 4,429,105 wherein such monomers can be esterified in the polymerization reaction vessel.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in an inert atmosphere (e.g., in a nitrogen atmosphere) at a temperature of about 240° C. for 10 to 20 hours.

The polyester of the present invention readily can be melt processed in the substantial absence of polymer degradation to form a variety of relatively stiff shaped articles, e.g., molded three-dimensional articles, fibers, films, tapes, etc.). The polyester of the present invention is suited for molding applications and may be molded via standard injection molding techniques commonly utilized when forming molded articles. Unlike some polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent weight of a solid filler (e.g., talc) and/or reinforcing agent (e.g., glass fibers) based upon the total weight of the molding compound. In a preferred embodiment, the solid filler and/or reinforcing agent is present in a concentration of approximately 10 to 40 percent by weight based upon the total weight of the molding compound.

The specifically defined polyester of the present invention also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 70 mils (e.g., 5 to 40 mils) may be utilized. Yarns of about 20 to 200 continuous filaments are commonly formed. The melt-spinnable polyester is supplied to the extrusion orifice at a temperature above its melting point (e.g., at a temperature of about 300° to 380° C.), and at a temperature of about 335° to 375° C. in a preferred embodiment. The polyester of the present invention exhibits a highly attractive balance between its melting and heat defection temperatures with the heat defection temperature always being at least 250° C. and preferably at least 270° C. The heat defection temperature of a molded article may be determined in accordance with the procedure of ASTM D648 wherein the defection temperature under load at 264 psi is ascertained.

Subsequent to extrusion through the shaped orifice the resulting filamentary material or film is passed in the direction of this length through a solidification or quench zone wherein the molten filamentary material or film is transformed to a solid filamentary material or film. The resulting fibers commonly have denier per filament of about 1 to 50, and preferably a denier filament of about 1 to 20.

The resulting filamentary material or film optionally may be subjected to a thermal treatment whereby its physical properties are further enhanced. The tenacity of the fiber or film may be increased by such thermal treatment. More specifically, the fibers or films may be thermally treated in an inert atmosphere (e.g., nitrogen, argon, helium) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 270° C. for 8 hours and at 280° C. for 15 hours. Alternatively, the fiber may be heated at about 15° to 20° C. below the temperature at which it melts for about 24 hours. Optimum heat treatment conditions will vary with the specific composition of the polyester and with the fiber's process history.

The as-spun fibers formed from the polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and a average single filament tensile modulus or initial modulus of at least about 300 grams per denier (e.g., about 475 to 600 grams per denier). Such properties are further enhanced by thermal treatment as previously indicated and enable the fibers to be used with particular advantage as tire cords and in other industrial applications, such as conveyor belts, hose, cabling, resin reinforcement, etc. Following heat treatment the fibers in preferred embodiments exhibit a tensile modulus or initial modulus of at least 750 grams per denier and most preferably at least 900 grams per denier. Films formed of the polyester of the present invention may be used as strapping tape, cable wrap, magnetic tape, electric motor dielectric film, etc. The fibers and films exhibit an inherent resistance to burning and a good retention of properties at elevated temperatures.

The following examples are presented as specific illustrations of the claimed invention. It should be understood, however, that the invention is not limited to the specific details set forth in the examples.

EXAMPLE I

To a two-liter three-neck flask equipped with a Vigreaux column and condenser, nitrogen inlet, thermocouple, and stainless steel "C" stirrer were added the following:

(a) 28.2 grams 6-hydroxy-2-naphthoic acid (0.15 mole), (b) 505.6 grams of 4-hydroxybenzoic acid (3.66 moles), (c) 181.9 grams of terephthalic acid (1.095 mole), (d) 13.2 grams of hydroquinone (0.12 mole), (e) 181.6 grams of 4,4'-biphenol (0.975 mole), and (f) 0.12 gram of potassium acetate catalyst.

The system was thoroughly purged of oxygen by evacuation and refilling with nitrogen three times. Next 627.8 grams of acetic anhydride (6.15 moles which represents a 2.5 percent molar excess) were added to the flask.

The flask was heated in a fluidized sand bath while purging with nitrogen. During the initial portion of this heating the hydroxyl groups of moieties I, II, IV, and V were converted to acetate groups (i.e., to 6-acetoxy-2-naphthoic acid, 4-acetoxybenzoic acid, hydroquinone diacetate, and 4,4'-biphenol diacetate). More specifically, the contents of the flask were heated to 125° C. over 50 minutes, to 140° C. over 40 minutes, to 150° C. over 20 minutes, to 200° C. over 45 minutes, to 210° C. over 5 minutes, to 220° C. over 6 minutes, to 275° C. over 50 minutes, to 310° C. over 70 minutes, to 335° C. over 25 minutes, to 350° C. over 15 minutes, and to 360° C. over 10 minutes. The system was slowly evacuated in 100 mbar increments to 10 mbar, the vacuum was released with dry nitrogen, and the contents of the flask were allowed to cool. The resulting polyester consisted of approximately 2.5 mole percent of recurring 6-oxy-2-naphthoyl moiety, approximately 61 mole percent of 4-oxybenzoyl moiety, approximately 18.25 mole percent terephthaloyl moiety, approximately 2 mole percent 1,4-dioxyphenylene moiety, and approximately 16.25 mole percent 4,4'-dioxybiphenyl moiety.

The inherent viscosity (I.V.) of the polymer was 7.5 dl./g. when dissolved in a concentration of 0.1 percent by weight in equal parts by volume of pentafluorophenol and hexafluoroisopropanol at 25° C. in accordance with the equation:

$$I.V. = \frac{\ln(\eta rel)}{c},$$

where c=concentration of solution (0.1 percent by weight), and ηrel=relative viscosity. When the polymer was subjected to differential scanning calorimetry (20° C./min. heating rate), it exhibited a melt endotherm peak at 366° C. The temperature of crystallization ($T_c$) of the polymer obtained upon cooling from the melt at 20° C./min. was 314° C. The polymer melt was optically anisotropic. The melt viscosity of the polymer was approximately 256 poise at 370° C. and a shear rate of 1,000 sec.$^{-1}$ as measured in a Kayeness capillary rheometer having a capillary die measuring 0.03 in. in diameter and 1 in. in length.

A molding compound was formed by blending OCF491 glass fibers having a length of approximately ⅛ in. with the resulting polyester in a concentration of 30 percent by weight based upon the total weight of the molding compound. Standard test bars were injection molded in a BOY Model 30M molding machine using the molding compound and were evaluated. More specifically, the molding compound while at a temperature of 330° C. and under a pressure of 7850 psi was injected into a standard mold provided at 100° C. The results of the evaluation are reported in Table A.

For comparative purposes Example I was substantially repeated with the exception that no hydroquinone was added to the polymerization flask and the quantity of the 4,4'-biphenol was correspondingly increased on a molar basis. The resulting polyester consisted of approximately 2.5 mole percent of recurring 6-oxy-2-naphthoyl moiety, approximately 61 mole percent of 4-oxybenzoyl moiety, approximately 18.25 mole percent of terephthaloyl moiety, and approximately 18.25 mole percent of 4,4'-dioxybiphenyl moiety. The recurring moieties of this polymer were in accordance with the teachings of U.S. Pat. No. 4,473,682. The inherent viscosity of the polymer was 7.25 dl./g. when dissolved in a concentration of 0.1 percent by weight in equal parts by volume of pentafluorophenol and hexafluoroisopropanol at 25° C. However, when the polymer was subjected to differential scanning colorimetry (20° C./min. heating rate), it exhibited a significantly higher melt endotherm peak of 377° C. The temperature of crystallization ($T_c$) of the polymer was 317° C. Comparable glass-filled molding compounds were formed and standard test bars were formed from the same and were evaluated. More specifically, the molding compound while at a temperature of 350° C. and under a pressure of 7,850 psi was injection molded using a BOY Model 30M molding machine and a standard mold provided at 100° C. Such higher molding temperature was required in order to achieve optimum molding results with the subject composition. These results are reported in Table A.

In the following Table A the heat deflection temperature was determined in accordance with the procedure of ASTM D648; wherein the deflection temperature under load at 264 psi was ascertained; the tensile strength was determined in accordance ASTM D638; the tensile modulus was determined in accordance with ASTM D638; the elongation was determined in accordance with ASTM D638, the flexural strength was determined in accordance with ASTM D790; the flexural modulus was determined in accordance with ASTM D790; and the Notch Izod Strength was determined in accordance with ASTM D256.

TABLE A

|  | Example I | Comparative Example |
|---|---|---|
| Melting Temperature (Tm) | 366° C. | 378° C. |
| Heat Deflection Temperature Under Load at 26 psi | 286° C. | 290° C. |
| Tensile Strength (psi) | 17,800 | 19,900 |
| Tensile Modulus (psi) | 2,100,000 | 1,860,000 |
| Elongation (percent) | 1.5 | 1.9 |
| Flexural Strength (psi) | 22,500 | 26,000 |
| Flexural Modulus (psi) | 1,800,000 | 1,880,000 |
| Notched Izod Strength (ft.-lb./in.) | 1.7 | 1.8 |

It will be observed that the mechanical properties of the product of Example I including the heat deflection temperature were surprisingly well maintained in spite of the reduced melting temperature exhibited by the product of the present invention.

EXAMPLE II

Additional batches of the polyester of Example I and of the Comparative Example were prepared and were melt extruded to form fibers which were evaluated. The polyester of Example II was advantageously melt extruded at the lower temperature of 375° C. while the polyester of the Comparative Example was melt extruded at the more elevated temperature of 395° C. A single hole spinneret was utilized having a diameter of 0.127 mm. and a length of 0.178 mm. while using a throughput rate of 0.45 gram/minute in each instance. The as-spun filaments were quenched in ambient air (i.e., at 72° F. and 65 percent relative humidity) prior to windup at a speed of 800 meters/minute. The higher melt-extrusion temperature was required with the polyester of the Comparative Example in order to achieve optimum spinning results. The as-spun filaments subsequently were heat treated at 300° C. for 8 hours in an atmosphere of nitrogen. The results of the evaluation are reported in Table B.

In the following Table B the filament tensile strength, elongation, and tensile modulus were determined in accordance with the procedure of ASTM D3822.

TABLE B

|  | Example II | Comparative Example |
|---|---|---|
| As-Spun Filament Tensile Strength (grams per denier) | 8.9 | 8.0 |
| As-Spun Filament Elongation (percent) | 1.6 | 1.4 |
| As-Spun Filament Tensile Modulus (grams per denier) | 563 | 595 |
| Heat-Treated Filament Tensile Strength (grams per denier) | 21.3 | 19.2 |
| Heat-Treated Filament Elongation (percent) | 2.1 | 1.8 |
| Heat-Treated Filament Tensile Modulus (grams per denier) | 939 | 990 |

It will be observed that the mechanical properties of the filaments formed from the product of the present invention were well maintained. Also, as previously indicated it was possible to melt extrude the filaments at a significantly lower temperature.

Although the invention has been described with preferred embodiments it is to be understood that variations and modifications may be employed without departing from the concept of the invention as defined in the following claims.

We claim:

1. A melt-processable polyester capable of forming an anisotropic melt phase at a temperature below approximately 375° C. and which is capable of forming a molded article which exhibits a heat defection temperature of at least 250° C. consisting essentially of the recurring moieties I, II, III, IV, and V wherein:

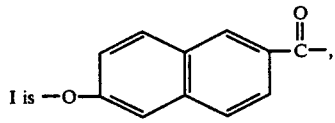
I is

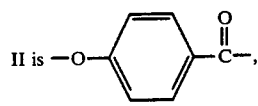
II is

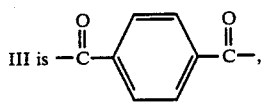
III is

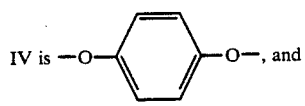
IV is —O— ... —O—, and

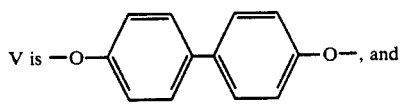
V is —O— ... —O—, and wherein said polyester comprises approximately 1.4 to 10 mole percent of moiety I, approximately 50 to 70 mole percent of moiety II, approximately 10 to 24.3 mole percent of moiety III, approximately 1 to 12.15 mole percent of moiety IV, and approximately 5 to 23.3 mole percent of moiety V, with the proviso that the molar concentration of moiety III is substantially the same as the total molar concentration of moieties IV and V, and the molar concentration of moiety IV does not exceed that of moiety V.

2. A melt-processable polyester according to claim 1 which is capable of forming an anisotropic melt phase at a temperature below approximately 370° C. and which is capable of forming a molded article which exhibits a heat deflection temperature of at least 270° C.

3. A melt-processable polyester according to claim 1 which exhibits an inherent viscosity of at least 6.0 dl./g. when dissolved in a concentration of 0.1 percent by weight in equal parts by volume of pentafluorophenol and hexafluoroisopropanol at 25° C.

4. A melt-processable polyester according to claim 1 which exhibits an inherent viscosity of approximately 6.5 to 9.5 dl./g. when dissolved in a concentration of 0.1 percent by weight in equal parts by volume of pentafluorophenol and hexafluoroisopropanol at 25° C.

5. A melt-processable polyester according to claim 1 which exhibits a melt viscosity in the range of approximately 10 to 1,500 poise at 370° C. and a shear rate of 1,000 sec.$^{-1}$.

6. A melt-processable polyester according to claim 1 wherein the aromatic rings of moieties I, II, III, IV, and V are substantially free of ring substitution.

7. A fiber which has been melt spun from the polyester of claim 1.

8. A film which has been melt extruded from the polyester of claim 1.

9. A molded article comprising the melt-processable polyester of claim 1.

10. A molding compound comprising the melt-processable polyester of claim 1 which incorporates approximately 1 to 60 percent by weight of solid material selected from the group consisting of filler, reinforcing agent, and a mixture of filler and reinforcing agent.

11. A melt-processable polyester capable of forming an anisotropic melt phase at a temperature below approximately 370° C. and which is capable of forming a molded article which exhibits a heat defection temperature of at least 270° C. consisting essentially of the recurring moieties I, II, III, IV, and V wherein:

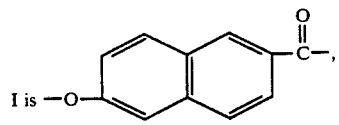
I is

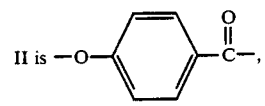
II is

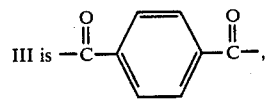
III is

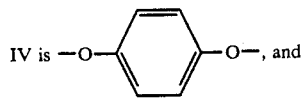
IV is —O— ... —O—, and

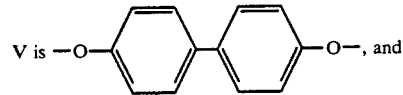
V is —O— ... —O—, and wherein said polyester comprises approximately 2 to 5 mole percent of moiety I, approximately 58 to 62 mole percent of moiety II, approximately 16.5 to 20 mole percent of moiety III, approximately 1.5 to 11 mole percent of moiety IV, and approximately 1.5 to 22 mole percent of moiety V, with the proviso that the molar concentration of moiety III is substantially the same as the total molar concentration of moieties IV and V.

12. A melt-processable polyester according to claim 11 which exhibits an inherent viscosity of at least 6.0 dl./g. when dissolved in a concentration of 0.1 percent by weight in equal parts by volume of pentafluorophenol and hexafluoroisopropanol at 25° C.

13. A melt-processable polyester according to claim 11 which exhibits an inherent viscosity of approximately 6.5 to 9.5 dl./g. when dissolved in a concentration of 0.1 percent by weight in equal parts by volume of pentafluorophenol and hexafluoroisopropanol at 25° C.

14. A melt-processable polyester according to claim 11 which exhibits a melt viscosity in the range of approximately 100 to 1,000 poise at 370° C. and a shear rate of 1,000 sec.$^{-1}$.

15. A melt-processable polyester according to claim 11 wherein the aromatic rings of moieties I, II, III, IV, and V are substantially free of ring substitution.

16. A melt-processable polyester according to claim 11 wherein said polyester comprises approximately 2.5 mole percent of moiety I, approximately 61 mole percent of moiety II, approximately 18.25 mole percent of moiety III, approximately 2 mole percent of moiety IV, and approximately 16.25 mole percent of moiety V.

17. A melt-processable polyester according to claim 11 wherein said polyester comprises approximately 5 mole percent of moiety I, approximately 60 mole percent of moiety II, approximately 17.5 mole percent of moiety III, approximately 8.75 mole percent of moiety IV, and approximately 8.75 mole percent of moiety V.

18. A fiber which has been melt spun from the polyester of claim 11.

19. A film which has been melt extruded from the polyester of claim 11.

20. A molded article comprising the melt-processable polyester of claim 11.

21. A molding compound comprising the melt-processable polyester of claim 11 which incorporates approximately 1 to 60 percent by weight of solid material selected from the group consisting of filler, reinforcing agent, and a mixture of filler and reinforcing agent.

* * * * *